US010694736B1

(12) United States Patent
Walsh et al.

(10) Patent No.: US 10,694,736 B1
(45) Date of Patent: *Jun. 30, 2020

(54) TAMPER-RESISTANT RODENT BAIT STATION

(71) Applicant: OMS Investments, Inc., Los Angeles, CA (US)

(72) Inventors: James R. Walsh, Wauwatosa, WI (US); Daniel C. Johnson, Madison, WI (US)

(73) Assignee: OMS Investments, Inc., Los Angeles, CA (US)

( * ) Notice: Subject to any disclaimer, the term of this patent is extended or adjusted under 35 U.S.C. 154(b) by 438 days.

This patent is subject to a terminal disclaimer.

(21) Appl. No.: 15/396,809

(22) Filed: Jan. 2, 2017

Related U.S. Application Data

(62) Division of application No. 12/983,725, filed on Jan. 3, 2011, now Pat. No. 9,532,564.

(51) Int. Cl.
*A01M 25/00* (2006.01)

(52) U.S. Cl.
CPC .......... *A01M 25/004* (2013.01); *A01M 25/00* (2013.01); *A01M 25/002* (2013.01)

(58) Field of Classification Search
CPC ... A01M 25/00; A01M 25/002; A01M 25/004
USPC .......................................................... 43/131
See application file for complete search history.

(56) References Cited

U.S. PATENT DOCUMENTS

| 3,032,915 | A | * | 5/1962 | Giroud-Abel | A01M 25/00 239/57 |
| 3,040,470 | A | * | 6/1962 | Kanin | A01M 1/2005 43/131 |
| 4,026,064 | A | * | 5/1977 | Baker | A01M 25/004 43/131 |
| 4,453,337 | A | * | 6/1984 | Williams | A01M 25/004 119/51.01 |
| 4,550,525 | A | * | 11/1985 | Baker | A01M 25/004 43/131 |
| 4,619,071 | A | * | 10/1986 | Willis | A01M 25/004 43/124 |

(Continued)

FOREIGN PATENT DOCUMENTS

| EP | 745323 A1 | * | 4/1996 |
| EP | 745323 A1 | | 12/1996 |

(Continued)

*Primary Examiner* — Darren W Ark
(74) *Attorney, Agent, or Firm* — Ulmer & Berne LLP (57) ABSTRACT

A pre-baited consumer bait station for rodents which is gnaw resistant and has other design features to make the bait station resistant to rodenticide access by children, dogs, other pets, domestic animals, and nontarget wildlife. An injection molded translucent cover is permanently locked to a base about the cover's edges and center by elastic actuated hooks which engage receptacles on the base. The cover forms a labyrinth joint with a peripheral wall of the base. Double walls on exterior portions of the peripheral wall strengthen the walls where they form part of a closely confining bait receptacle which surrounds a bait block on portions of all sides. Circuitous internal passageways limit access to the bait. An interior wall extends to support the cover center.

14 Claims, 4 Drawing Sheets

(56) References Cited

U.S. PATENT DOCUMENTS

| | | | | |
|---|---|---|---|---|
| 4,637,162 A * | 1/1987 | Sherman | | A01M 25/004 43/131 |
| 4,658,536 A * | 4/1987 | Baker | | A01M 25/004 43/124 |
| 4,660,320 A * | 4/1987 | Baker | | A01M 25/004 43/131 |
| 5,040,327 A * | 8/1991 | Stack | | A01M 25/004 220/281 |
| 5,136,803 A * | 8/1992 | Sykes | | A01M 25/004 43/131 |
| 5,272,832 A * | 12/1993 | Marshall | | A01M 25/004 220/326 |
| 5,448,852 A * | 9/1995 | Spragins | | A01M 25/004 43/131 |
| 5,806,237 A * | 9/1998 | Nelson | | A01M 25/004 43/131 |
| 5,960,585 A | 10/1999 | Demarest et al. | | |
| 6,082,042 A * | 7/2000 | Issitt | | A01M 25/004 229/116 |
| 6,145,242 A * | 11/2000 | Simpson | | A01M 1/2011 43/131 |
| 6,272,791 B1 | 8/2001 | Pleasants | | |
| 6,370,814 B1 * | 4/2002 | Curtis | | A01M 1/2005 43/121 |
| 6,397,517 B1 * | 6/2002 | Leyerle | | A01M 23/24 43/131 |
| 6,493,988 B1 * | 12/2002 | Johnson | | A01M 25/004 43/131 |
| 6,513,283 B1 * | 2/2003 | Crossen | | A01M 25/004 43/131 |
| 6,807,768 B2 * | 10/2004 | Johnson | | A01M 25/004 43/131 |
| 7,669,363 B2 * | 3/2010 | Frisch | | A01M 25/004 43/131 |
| 7,784,216 B2 * | 8/2010 | Kaukeinen | | A01M 25/004 43/124 |
| 7,980,023 B2 * | 7/2011 | Nelson | | A01M 25/004 43/114 |
| 7,987,629 B2 * | 8/2011 | Harper | | A01M 25/004 220/525 |
| 8,209,900 B2 * | 7/2012 | Vickery | | A01M 25/004 43/131 |
| 8,793,929 B1 * | 8/2014 | Walsh | | A01M 23/30 43/131 |
| 8,984,802 B1 * | 3/2015 | Walsh | | A01M 25/004 43/131 |
| 9,532,564 B1 * | 1/2017 | Walsh | | A01M 25/004 |
| 2004/0244274 A1 * | 12/2004 | Dellevigne | | A01M 25/004 43/131 |
| 2005/0028431 A1 * | 2/2005 | Hoyes | | A01M 25/004 43/131 |
| 2006/0117644 A1 * | 6/2006 | Hoyes | | A01M 25/004 43/131 |
| 2008/0072475 A1 | 3/2008 | Nelson et al. | | |
| 2009/0229170 A1 * | 9/2009 | Gaibotti | | A01M 25/004 43/131 |
| 2009/0307963 A1 * | 12/2009 | Abbas | | A01M 25/004 43/131 |
| 2010/0050498 A1 | 3/2010 | Nelson et al. | | |
| 2010/0325940 A1 | 12/2010 | Pryor et al. | | |
| 2011/0219666 A1 | 9/2011 | Vickery | | |
| 2011/0283600 A1 | 11/2011 | Harper | | |
| 2012/0102821 A1 * | 5/2012 | Jovic | | A01M 25/004 43/131 |
| 2012/0124891 A1 * | 5/2012 | Jovic | | A01M 25/004 43/131 |
| 2013/0118056 A1 * | 5/2013 | Covington | | A01M 25/004 43/131 |
| 2013/0174471 A1 * | 7/2013 | Vickery | | A01M 25/004 43/131 |
| 2013/0333273 A1 * | 12/2013 | Esculier | | A01M 23/02 43/58 |
| 2017/0188565 A1 * | 7/2017 | Ots | | A01M 1/2011 |

FOREIGN PATENT DOCUMENTS

| | | | | |
|---|---|---|---|---|
| EP | 1057958 A2 | 12/2000 | | |
| EP | 1057958 A2 * | 12/2000 | | A01M 25/004 |
| EP | 2100504 A2 * | 9/2009 | | A01M 25/004 |
| EP | 2100504 A2 | 9/2009 | | |
| FR | 2564287 A1 * | 11/1985 | | A01M 25/004 |
| FR | 2564287 A1 | 11/1985 | | |
| GB | 2063040 A * | 6/1981 | | A01M 25/004 |
| GB | 2063040 A | 6/1981 | | |
| GB | 2394642 A | 5/2004 | | |
| GB | 2394642 A * | 5/2004 | | A01M 25/004 |
| JP | 2009159938 A * | 7/2009 | | |
| JP | 2009159938 A | 7/2009 | | |
| WO | 2005006857 A2 | 1/2005 | | |
| WO | WO-2005006857 A2 * | 1/2005 | | A01M 25/004 |
| WO | 2009157027 A1 | 12/2009 | | |
| WO | WO-2009157027 A1 * | 12/2009 | | A01M 25/004 |

* cited by examiner

TAMPER-RESISTANT RODENT BAIT STATION

CROSS REFERENCE TO RELATED APPLICATION

This application is a division of U.S. patent application Ser. No. 12/983,725, filed Jan. 3, 2011, entitled "Tamper-Resistant Rodent Bait Station," the disclosure of which is hereby incorporated herein by reference in its entirety.

STATEMENT AS TO RIGHTS TO INVENTIONS MADE UNDER FEDERALLY SPONSORED RESEARCH AND DEVELOPMENT

Not applicable.

BACKGROUND OF THE INVENTION

The present invention relates to rodent bait stations in general and rodent bait stations for consumer use in particular.

Rodenticides can be particularly effective in treating infestations of rodent pests. Bait stations provide an effective mechanism for isolating the rodenticide from children, dogs, other pets, domestic animals, and non-target wildlife. Because the bait associated with the rodenticide can be attractive to non-targeted species, it is desirable to limit access to the rodenticide to dogs, for example, which can devote extended time to gaining entry to a container. Bait stations should not only obstruct the physical entry of the non-targeted species into the station, but also make it difficult for a pet to gain access to the interior by chewing or gnawing on the station. The bait station should also limit the access of children to the bait within.

SUMMARY OF THE INVENTION

The bait station of this invention is a pre-baited consumer item sized either for mice or rats. The gnaw resistant bait station of this invention incorporates one or more design features in order to make the bait station resistant to pets or people coming into contact with the bait contained within. The bait station is constructed of two injection molded parts, a base part and cover part, which are locked together without provision for opening. The base has a floor and a peripheral wall extending upwardly from the floor. The cover is assembled to overlie the peripheral wall and has a plurality of hooked prongs which engage with retaining receptacles on the base typically along the peripheral wall. The hooked prongs are elastically deformed as the hooks are pressed into receptacles until a hook surface is free to move laterally to engage a lateral surface on the base which locks the hooked prongs to the base. A plurality of such hooked prongs are spaced along the periphery so that no substantial portion of the cover is not locked to the peripheral wall. Because no access is provided to the prongs from the outside, the locking engagement is essentially permanent. At least one hooked prong extends from the approximate center of the cover to structurally tie the interior of the cover to the base. The cover forms a labyrinth joint with the peripheral wall such that a knife blade, a fingernail, or canine incisor cannot easily pass between the cover and the peripheral wall. A canine can act as a Wedge if it is able to pass between the edge of the cover and the edge of the peripheral wall. Thus the labyrinth joint, by preventing penetration between the peripheral wall and the cover, prevents the canine tooth from gaining a mechanical advantage.

The bait within the station is protected from contact by a human finger or a dog's tongue by arrangement of a one or a plurality of openings which are distant from and baffled from the bait. The baffle is formed by an interior wall that extends from the peripheral wall between the opening and the bait, and the geometric relation between the location of the opening and the bait is such that a line passing perpendicular to a peripheral wall must be bent by at least about 180° before it can contact the bait. The interior wall extends substantially to the center of the bait station and supports the floor and cover from a crushing load caused in smaller stations by the closing jaw of a dog, or in larger stations by being stepped on by a person.

Reinforcements are provided to the base peripheral wall where it turns a corner in an area where a dog could get an effective grip on the corner and potentially crush the peripheral wall at the corner. The peripheral wall is reinforced by doubling it, i.e., by creating a second wall interior to the peripheral wall which is preferably reinforced with multiple radial webs which join the second interior wall to the outer peripheral wall. The second interior walls may be parallel to the outer peripheral wall or extend diagonally across the corners.

Features within the bait station lock a bait block within a restricted bait receptacle by peripheral walls and interior walls which surround the block on at least portions of all four sides, while leaving at least one point of access so the bait may be gnawed by the targeted rodent. Retention of the rodent bait block may additionally be achieved by disposing the bait block over a central post which prevents the bait block moving toward the rodent opening. In some cases such structure may remove the need to surround the bait block at least partially on four sides.

The plastic selected for formation of the base should be strong to prevent excessive deflections to the station structure, but also of a tough material which resists puncture or fracture. The cover is also constructed of strong tough material and may be made transparent or translucent to allow the status of the bait to be checked. Polypropylene or Nylons are examples of suitable materials for forming the bait station and the cover.

It is an object of the present invention to provide a bait station which resists being opened by children, dogs, other pets, domestic animals, and non-target wildlife.

It is a further object of the present invention to provide a pre-baited disposable bait station which better retains the enclosed bait.

It is another object of the present invention to provide a bait station which is resistant to a child accessing the bait through the rodent access openings.

It is yet another object of the present invention to provide a rodent bait station which provides for visual inspection of the enclosed rodenticide.

Further objects, features and advantages of the invention will be apparent from the following detailed description when taken in conjunction with the accompanying drawings.

DESCRIPTION OF THE PREFERRED EMBODIMENTS

Figure 1:
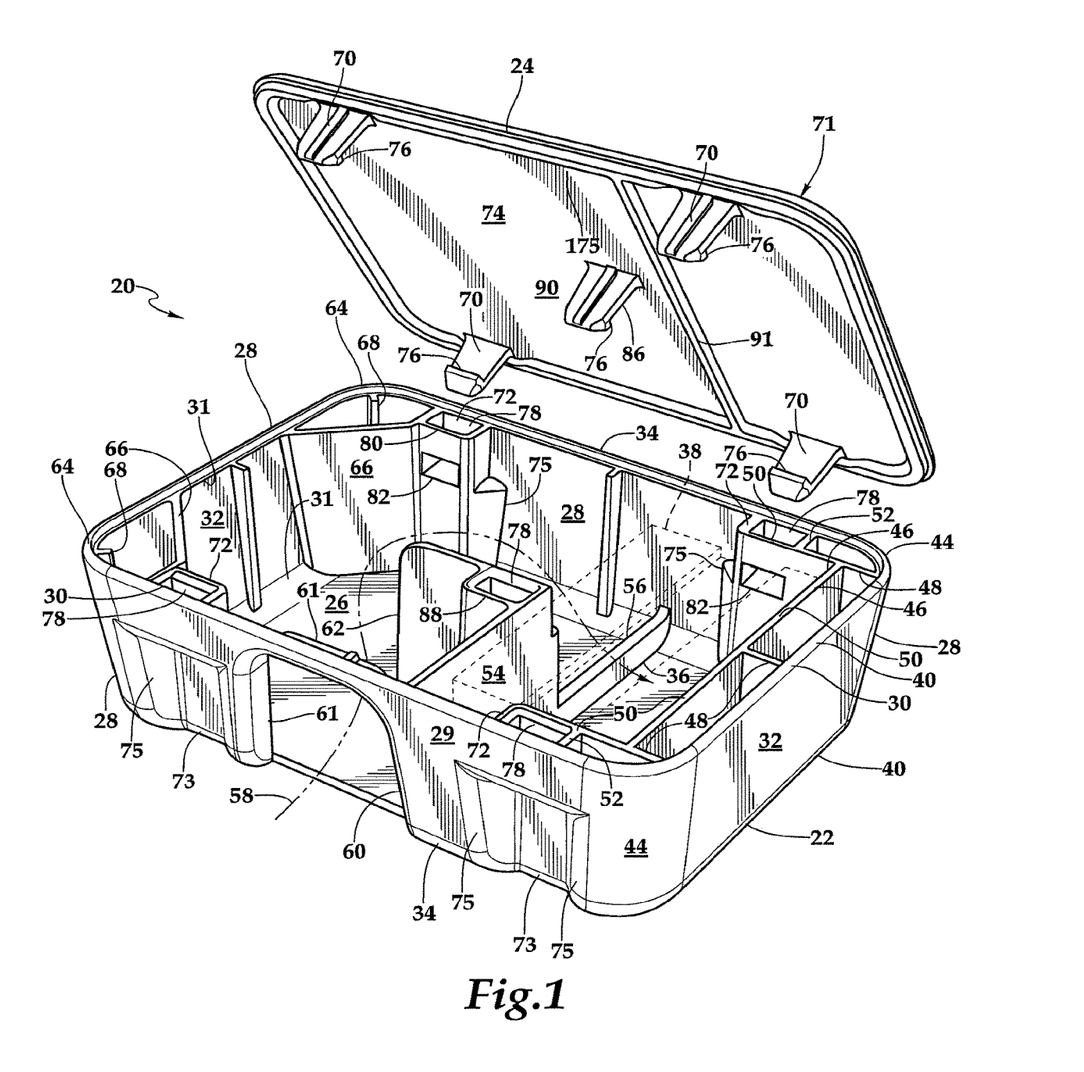
FIG. 1 is an exploded perspective view of a mouse bait station of this invention.

Referring more particularly to FIGS. 1-9 wherein like numbers refer to similar parts, a bait station 20 for baiting mice is shown an FIG. 1. The mouse bait station 20 is comprised of a base 22, and the lid 24. The base 22 has a floor 26 surrounded by an upwardly extending peripheral wall 28. The peripheral wall 28 defines an exterior surface 29, an upper peripheral edge 30, and together with the lid 24 defines an interior volume 31. The base 22 is rectangular having two short sides 32 and two long sides 34, with the result that the peripheral wall 28 and upper peripheral edge 30 have a corresponding rectangular shape.

The base 22 defines a bait receptacle 36 containing a rodenticide bait block 38. The bait block 38 has the general shape of an extruded rectangular prism with additional gnaw edges provided by grooves in the faces of the bait block, such as the ones disclosed in U.S. Pat. No. 5,044,113, the disclosure of which is incorporated by reference herein. The bait receptacle 36 is positioned against a short wall 40 corresponding to one of the short sides 32 and extends partway along the two long walls 34 which join the short wall 40 at corners 44. The short wall 40 and the corners 44 are reinforced with an interior wall 46 which is spaced inwardly of the short wall 40 and is connected by three short spacer segments 48 which extend to the short wall. Although for ease in manufacture only the central short spacer segments 48 may be used.

On either side of the interior wall 46 are reinforcing wall segments 50 which are inwardly spaced along the long walls 34 forming double walls resist penetration or deflection. The wall segments 50 are again connected by short spacer segments 52 which join the wall segments 50 to the exterior peripheral wall 28. The bait receptacle 36 is completed by portions of an interior wall 54 which is partly cut away, leaving a knee wall 56 over which a rodent can gain access to the bait 38. The close confinement of the bait block holds the bait block to limit damage to the bait block by the bait station being shaken, and prevents the movement of the bait out of the protected bait receptacle which holds the bait distant from the rodent access opening.

The base 22 has a floor plan which provides a path 58 to the bait 38 from a rodent access opening 60 in the peripheral wall 28. The access opening 60 is strengthened by an inwardly protruding rim 61 that extends around the access opening adding rigidity to the peripheral wall 28 around the opening. The path 58 initial direction is nominally defined as being a line perpendicular to the portion of the peripheral wall 28 which defines the rodent access opening 60 and centered within the opening. The path 58 provides a circuitous route easily traversed by the target rodent, and defined by the peripheral wall 28 and the interior wall 54. Referring to FIG. 1, immediately upon entry through the access opening 60 the rodent is blocked from moving to the right by the interior wall 54, and blocked from moving straight ahead by an extension of the interior wall 62 which extends at a right angle from the main part of the interior wall 54, such that the rodent and the rodent path is turned 90° to the left from the initial direction perpendicular to the peripheral wall. To reach the bait the rodent must proceed along the path 58 around the baffle formed by the wall portion 62 and must execute a turn of about 180° to access the bait 38 through the opening over the knee wall 56. So if the rodent proceeds by making only 90° turns in approach the bait substantially three 90° turns are required to reach the bait.

Corners 64 opposite the corners 44 bracketing the bait receptacle 36 may also be reinforced by interior walls 66 which extend between the short side 32 and the adjacent long sides 34. The corners 64 have perpendicular flanges 68 which extend upward from the floor 26 along the wall 28 and a short distance inwardly from the apex of the corners along radiuses defining the corners. The perpendicular flanges 68 support the lid 24 overlying the corners 64.

Figure 6:
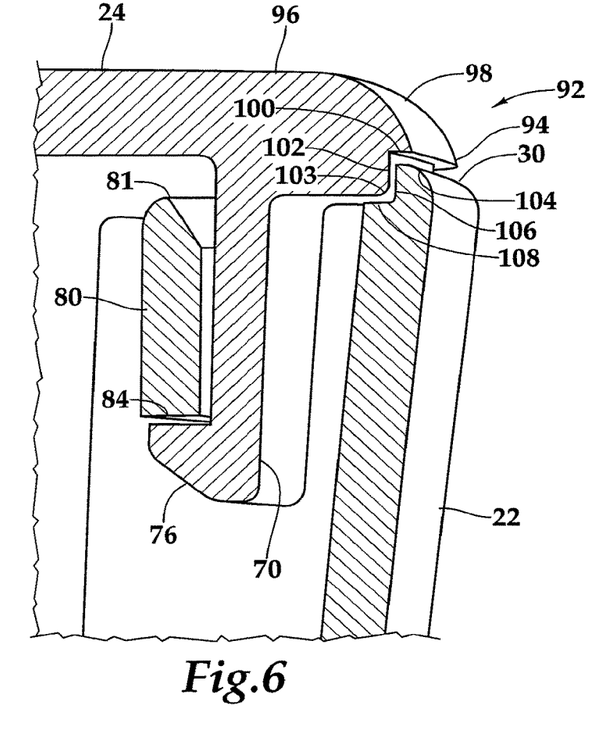
FIG. 6 is a fragmentary cross-sectional side view of the lid and peripheral wall joint employed by the mouse bait station of FIG. 1.

As the bait station is not intended to be rebaited, the lid 24 is preferably locked to the base without any provision for opening the lid. The bait station is prebaited and the lid secured to the base by the manufacturer before distribution to retail outlets. The lid 24 of the bait station 20 is constructed of translucent or clear plastic so that the bait 38 is visible and it can be determined whether the bait has been visited by rodents. The lid has five prongs 70, 86 which latch within receptacles 72, 88 which are integrally formed with the base 22, Each prong extends downwardly from the inner cover surface 74 of the lid 22 and terminates with a hook 76, as shown for example in FIG. 6. As shown in FIG. 1, the receptacles 72, 88 have rectangular openings 78 which face upwardly. As shown in FIG. 6, the receptacles have hook deflexing flanges 80 which have upper surface 81 which force the hook on each prong into the opening of a receptacle 72, 88. Each receptacle has a hook opening 82 below the deflection flange 80 which extends downwardly and which faces the interior of the station 20. The prong 70 and hook 76 pass through the rectangular opening 78 until the hook 76 is opposite an opening 82, where the prong 70 elastically moves the hook 76 into position below the deflection flange 80, thereby locking the hook in engagement with a lower surface 84 of the flange 80.

The central prong 86 joins a central receptacle 88 which is integrally joined with the inner wall 54 and which not only locks the center 90 of the lid 24 to the base 22 but the receptacle also supports the center of the lid against crushing forces. A bar structure 91 extends downwardly from the inside 74 of the cover across the bait receptacle 36 and toward the bait 38 to further constrain bait movement within the bait receptacle.

The receptacles 72 perform a double function with respect to the bait receptacle 36 in forming an extension to the reinforcing wall segments 50. The formation of the four receptacles 72 which are positioned against the peripheral wall 28 using the injection molding process requires that the mold cavity have pillars positioned beneath the receptacles 72 so that the mold pillars form pillar indentations 73 on the outside 29 of the peripheral wall 28. The pillar indentations 73 ordinarily require only a tapered cross-section which leads to the receptacle structure 72. However, in order to create an exterior surface 29 which minimizes tooth gripping surfaces, the pillars have tapered sides which create pillar indentations 73 with gently angled sides 75 as shown in FIG. 1.

As shown in FIG. 6, a labyrinth joint 92 is formed between the peripheral edge 94 of the lid 24 and the uppermost peripheral edge 30 of the base 22. The labyrinth joint 92 is shown in FIG. 6 as slightly spaced apart for clarity. The peripheral edge 94 of the lid 24 starts from the upper surface 96 which transitions into a gentle downward radius 98 which forms the peripheral edge 94. The lid 24 has portions 100 which step inwardly, and portions which step downwardly 102 and form a lowermost edge 103. The downward step facing outwardly formed by the lid portions 100, 102 lines up with a complementary step on the base upper peripheral edge 30 which has portions 104 which step inwardly, and portions 106 which step downwardly and portions 108 which step inwardly again, to form a downward step facing inwardly and upward. The result is the joint 92 forming a labyrinth path which is highly resistant to a canine tooth, fingernail or other object passing between the lid 24 and the base 22 and obtaining a grip adequate to pry the lid away from the base. Little peripheral edge 30 protrudes beyond the lid 24, such that it is difficult to obtain any grip on the lid or the base such that they can be separated.

The portion of the interior volume 31 occupied by the rodent in gaining access to the bait 38 is preferably sufficient such that the rodent can turn around and exit the bait station opening 60, nose first, as it is generally understood that rodents are more willing to access spaces which allow them to emerge nose first. While the precise dimensions are not critical, by way of example the bait station 20 may be 3½ inches long by 2½ inches wide by 1¼ inches high, and the corners 44, 64 have a radius of ½ inch. The labyrinth joint 92 and the integral connection between the floor 26 of the base and the peripheral wall 28 have a radius of curvature of about ¼ inches. Double walls mean that even if a chewing pet can puncture the outer wall, the spacing of the inner wall away from the outer wall makes it difficult to penetrate both walls. The gentle radii of the lid and the base also make it difficult for pets to effectively get a grip on these areas and chew on them.

Figure 2:
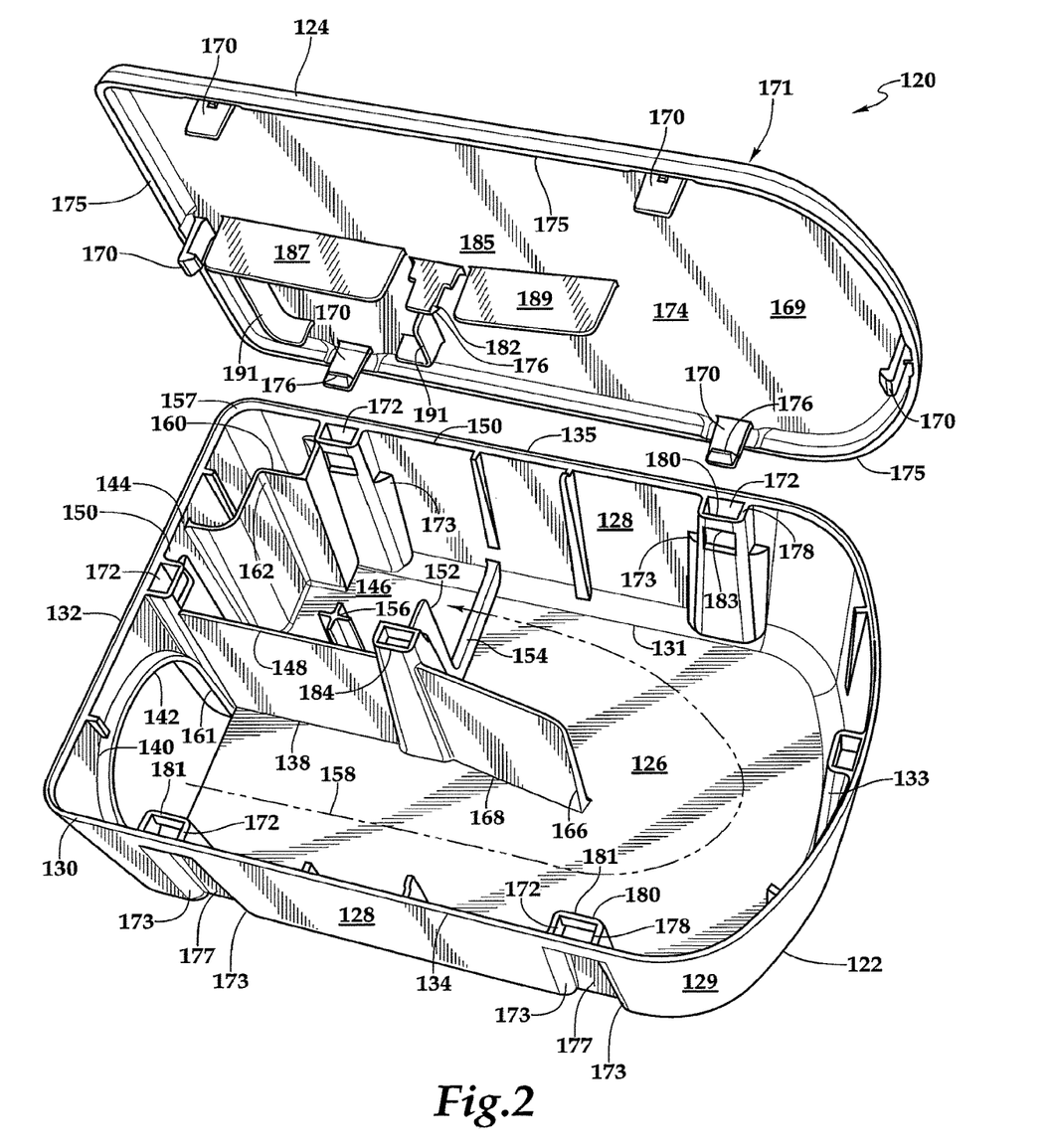
FIG. 2 is an exploded perspective view of a rat bait station of this invention.

A bait station 120 for rats is shown in FIG. 2 which employs many of the design features discussed with respect to the mouse bait station 20. The bait station 120 is composed of a base 122 and a lid 124. The base 122 has a floor 126 and an upwardly extending peripheral wall 128 terminating in an upper peripheral edge 130. The base 122 and the lid 124 define therebetween an internal volume 131, The base again has a generally rectangular shape with two short walls 132, 133 and two long walls 134, 135. One short wall 132 is substantially straight, and the other short wall 133 forms a gentle curve in the shape of an arc of a circle. An interior wall 138 extends from the straight short wall 132 substantially parallel to the long walls, approximately 60% of the distance between the short straight wall 132 and the curved wall 133. The interior wall 138 divides the short straight wall 132 approximately in half, forming a first wall portion 140 which defines an opening 142 for the entry of a rat into the interior 131, and a second slightly smaller wall portion 144 which forms part of a bait receptacle 146. The access opening 142 is strengthened by an inwardly protruding rim 161 that extends around the access opening adding rigidity to the peripheral wall 128 around the opening.

Figure 3:
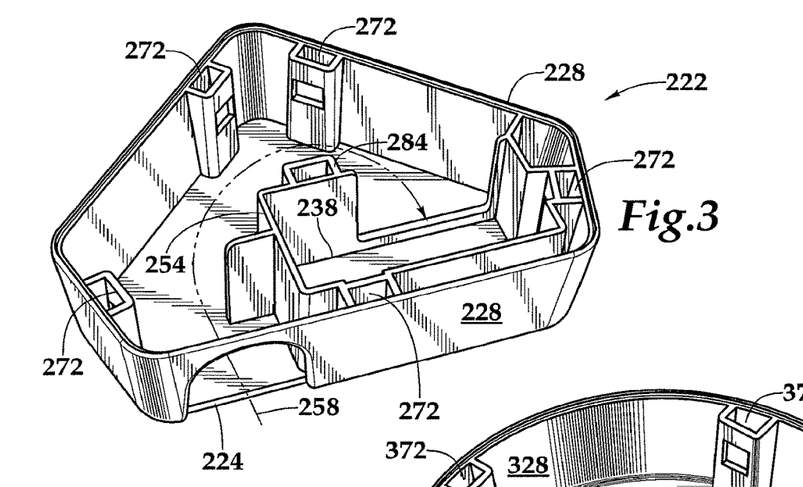
FIG. 3 is a top perspective view of the base of an alternative embodiment mouse bait station for use in a corner.

The bait receptacle 146 is formed between the second wall portion 144 of the short wall 132, and a portion 148 of the interior wall 138, and a portion 150 of the bait side long side wall 135. Finally, an extension 152 of the interior wall 138 extends between the interior wall 138 and joins the long wall 135 forming the bait receptacle 146. A bait post 156 extends upwardly from the floor 126 and is approximately centered within the bait receptacle 146. A bait block (not shown) having a central hole is placed over the post 156. Portions of the extension 152 of the interior wall form a knee wall 154 over which a rodent can gain access to a bait block within the bait receptacle 146. The bait receptacle 146 is reinforced along the corner 157 by reinforcing wall 160 which extends from the second wall portion 144 to the wall portion 150 of the bait station base. The reinforcing wall 160 forms a corner 162 which positions and holds the bait block (not Shown). In general, corners near the bait block, and forming part of the bait receptacle which are relatively sharp (for example having an interior angle of less than about 135°, typically about 90° as shown in FIGS. 2 and 3), will be reinforced by a further interior wall 66, 160 substantially the height of the peripheral wall and spaced inwardly of the peripheral wall at said corner. The reinforcing wall segment is wholly or substantially interior to the bait receptacle and extending across the corner with the included angle of less than 135° from the outer peripheral wall to the outer peripheral wall to create a reinforced corner.

The base 122 has a floor plan which provides a path 158 to the bait from the rat access opening 142. The path 158 again defines a direction perpendicular to the straight Short wall 132 which defines the rodent access opening 142 and is centered within the opening. The path 164 provides a circuitous route easily traversed by the target rodent, and defined by the peripheral wall 128 and the interior wall 138. Referring to FIG. 2, immediately upon entry through the access opening 142 the rat is blocked from moving to the left by the interior wall 138, and moves straight ahead until it must make a 180° turn around the end 166 of the interior wall 138 to access the bait through the opening over the knee wall 154. A portion 168 of the interior wall near the wall end 166 is angled to narrow the path 158 just before the path passes around the interior wall 138 and turns toward the bait (not shown) in the bait receptacle 146. This narrowing of the path 158, combined with the 180° turn and the spacing of the bait from the curved wall 133 prevents a small child from reaching through the access opening 60 and reaching around the interior wall 138 to reach the bait in the bait receptacle 146. The bait station 120 is designed with interior walls shielding the bait from the rodent accessible opening so that if the rodent proceeds by 90° turns, two 90° turns must be made to reach the bait, thus effectively isolating the bait from the rodent access opening, which isolates the bait from pets and humans.

The lid 24 of the bait station 120 is constructed of translucent or clear plastic so that the bait in the bait receptacle 146 is visible and it can be determined whether the bait has been visited by rodents. The lid has a lower surface 169, an upper surface 171, a peripheral edge 175 and seven prongs descending from the inner surface of the lid. The seven prongs consist of six peripheral prongs 170 which latch within receptacles 172, and one central prong 182 which latch within a central protrusion receptacle 184 which extends up from the base. All the receptacles 172, 184 are integrally formed with the base 122. Each prong extends downwardly from the inner cover 174 of the lid 122 and terminates with a hook 176.

The receptacles 172, 184, have upwardly facing rectangular openings 178 with a hook deflexing flange 180 which has an upper surface 181 which forces the hook on each prong into the opening of a receptacle 172, 184. The prongs 170 and the respective hooks 176 pass through the openings 178 and are elastically moved to engage the bottoms 183 of the flanges 180 in a way similar to that described with respect to the arrangement shown in FIG. 6. The central prong 182 joins the central protruding receptacle 184 which is integral to the inner wall 138 and which not only locks the center 185 of the lid 124 to the base 122 but the receptacle also supports the center of the lid against crushing forces, such as produced by stepping on the lid 124. Because the bait station 120 is injection molded, the thickness and therefore the amount of material used in the interior wall 138 can be minimized by extending the wall only part way to the lid 124, and having the interior wall completed by a first short wall segment 187 which extends downwardly and slightly overlaps the interior wall on the side away from the bait receptacle 146 between the straight wall 132, and the central protruding receptacle 184, and a second short wall segment 189 which extends downwardly and slightly overlaps the angled portion 168 of the interior wall 138, on the bait receptacle side. The lid 124 has two additional short wall segments 191 which in combination with the first short wall segment 187 serve to hold a bait block (not shown the bait receptacle 146.

The formation of the six receptacles 172 which are positioned against the peripheral wall 128 using the injection molding process requires that the mold cavity have pillars positioned beneath the receptacle 172 so that the mold pillars form pillar indentations 177 on the outside 129 of the peripheral wall 128. The pillar indentations 177 have the necessary tapered cross-section which leads to the receptacle structure 172. However, in order to minimize tooth gripping surfaces, the pillars have tapered sides 173 which create pillar indentations similar to those shown in FIG. 1 with gently angled sides.

Figure 8:
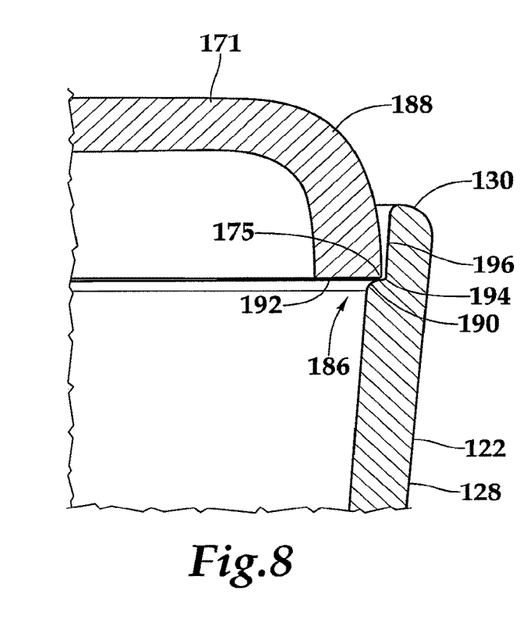
FIG. 8 is a fragmentary cross-sectional side view of the lid and peripheral wall joint employed by the rat bait station of FIG. 2.

The upper peripheral edge 130 of the base 122 meets the peripheral edge 175 of the lid 124 in a labyrinth joint 186 as shown in FIG. 8. The peripheral edge 175 of the lid 124 starts from the upper surface 171 which transitions into a gentle downward radius 188 which forms the peripheral edge 175. The edge 175 has a simple flat lower surface 192 which fits with a complementary downward step facing inwardly 194 in the upper peripheral edge 130 which step has portions 196 which step downwardly and portions 190 which step inwardly. The result is that the joint 186 forms a labyrinth path which again is highly resistant to a canine tooth, finger nail or other object passing between the lid 124 and the base 122 so as to pry the lid away from the base.

The portion of the interior volume 131 occupied by a rat in gaining access to the bait is preferably sufficient such that the rat can turn around and exit the bait station opening 142 nose first, as it is generally understood that rodents are more willing to access spaces which allow them to emerge nose first. The bait station 120 as shown in FIG. 2 may have, for example, dimensions of 7½ inches long, 5¼ inches wide, and 3 inches high. The labyrinth joint 186 and the integral connection between the floor 26 of the base and the peripheral wall 28 have a radius of curvature of about ¼ inches.

There are general design principles of this invention which can be used to form a variety of bait stations: reinforce corners and sides positioned about a bait receptacle; avoid sharp corners, which facilitate gnawing; permanently attach lids to the bait station bases by resilient members which lock the covers to the bases; employ serpentine paths between the rodent entry to the bait station, and the bait; securely retain bait blocks; centrally attach the cover to the base; and facilitate interior bait observations with a transparent cover. Three additional configurations for applying these design principles are illustrated in FIGS. 3-5, with the bait station covers removed for clarity.

FIG. 3 shows a pentagonal bait station base 222 designed to fit in a corner. The base 222 has an opening 224 in a peripheral wall 228 and a bait receptacle 238 which surrounds a bait block (not shown) on part of at least four sides, wherein the bait receptacle is double walled where the bait receptacle joins the peripheral wall 228. A lid (not shown) is joined to five receptacles 272 and a central receptacle 284 in a manner similar to that shown with respect to the bait station 20. A path 258 provides a circuitous route easily traversed by the target rodent, and defined by the peripheral wall 228 and the interior wall 254 which involves turns of over 180°.

Figure 4:
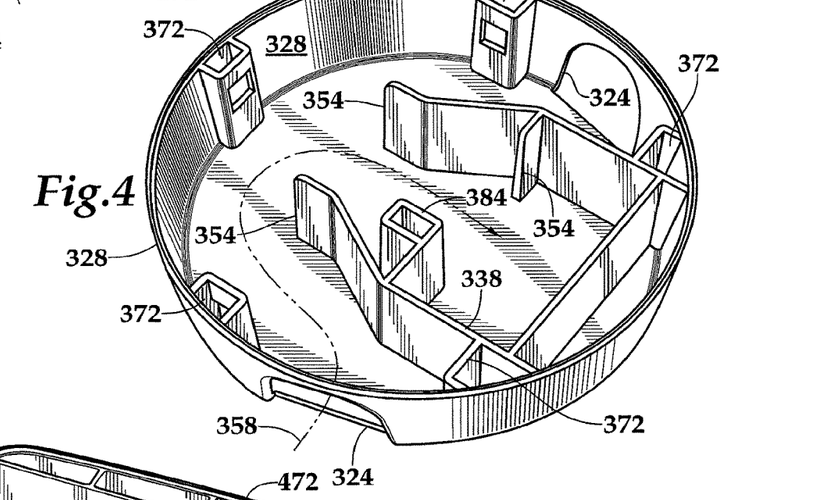
FIG. 4 is a top perspective view of the base of an alternative embodiment round mouse bait station.

FIG. 4 shows a circular bait station base 322. The base 322 has an opening 324 in a peripheral wall 328 and a bait receptacle 338 which surrounds a bait block (not shown) on part of at least four sides, wherein the bait receptacle is double walled where the bait receptacle joins the peripheral wall 328. A lid (not shown) is joined to five receptacles 372 and a central receptacle 384 in a manner similar to that shown with respect to the bait station 20. A path 358 provides a circuitous route easily traversed by the target rodent, and defined by the peripheral wall 328 and the interior wall 354 which involves turns of over 180°.

Figure 5:
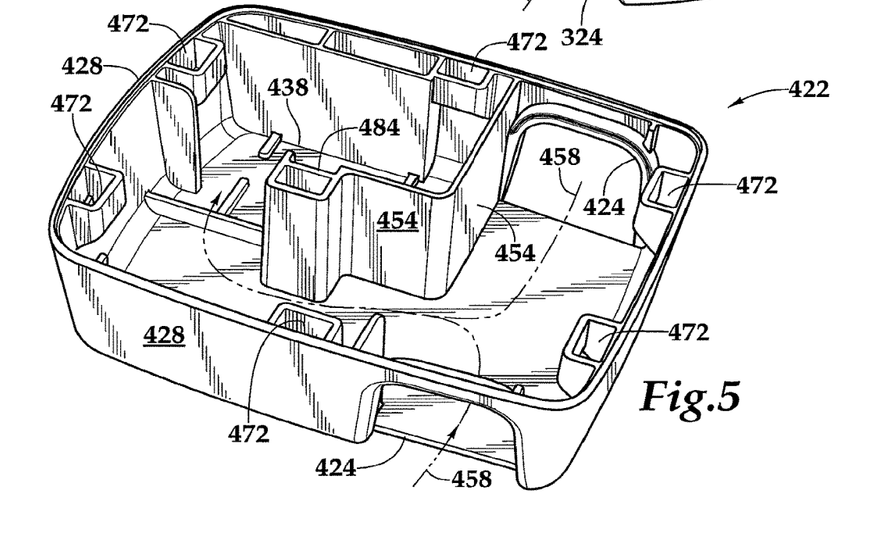
FIG. 5 is a top perspective view of the base of an alternative embodiment two-opening mouse bait station.

FIG. 5 shows a two-entry rectangular bait station base 422 design. The base 422 has two openings 424 in a peripheral wall 428 and bait receptacle 438 which surround a bait block (not shown) on part of at least four sides, wherein the bait receptacle is double walled where the bait receptacle joins the peripheral wall 428. A lid (not shown) is joined by hooked prongs to six receptacles 472, and a central receptacle 484 in a manner similar to that shown with respect to the bait station 20. A path 458 provides a circuitous route easily traversed by the target rodent, and defined by the peripheral wall 428 and the interior wall 454 which involves turns of over 180°.

It should be understood that where FIGS. 3-5 depict mouse scaled devices, similar devices for use with rats based on the principles illustrated with respect to FIG. 2 may also be used, e.g., a larger scale device which utilizes the interior wall to prevent a child's arm from reaching into the bait receptacle.

Figure 7:
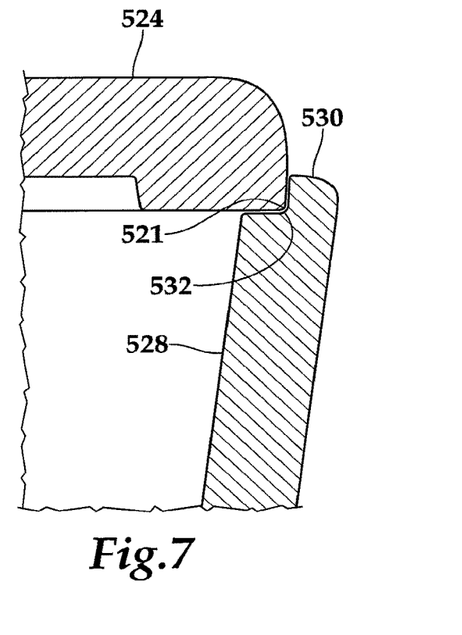
FIG. 7 is a fragmentary cross-sectional side view of an alternative embodiment of a lid and peripheral wall joint such as can be used with the mouse bait stations of FIGS. 3 and 4.
Figure 9:
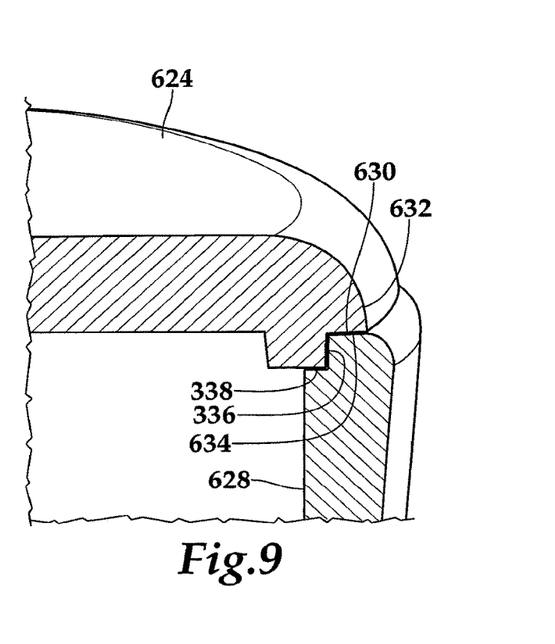
FIG. 9 is a fragmentary cross-sectional side view of a further alternative embodiment of a lid and peripheral wall joint such as can be used with a mouse bait station.

A further design of a labyrinth joint between a lower peripheral edge 521 of a bait station lid 524 and an upper peripheral edge 530 of the peripheral wall 528 is shown in FIG. 7. The peripheral wall 528 has an inward facing step 532 into which the lower peripheral edge 521 of the lid 524 fits. A yet further labyrinth joint is illustrated in FIG. 9 between a bait stations lid 624, and an upper peripheral edge 630 of a peripheral wall 628. The labyrinth joint is similar to that Shown in FIG. 7 with the addition of a portion 632 of the lid 624 which extends and overlies a portion 634 of the peripheral wall 628, so the portion 632 of the peripheral wall 530 steps in, further portions 636 step down and finally a portion 638 of the peripheral wall steps in again in contact with corresponding surfaces on the lid 624.

It should be understood that a bait block referrers generally to a single unitary generally but not necessarily prismatic in shape block which contains rodenticide, rodent feed, and a binder (e.g., paraffin wax), and is distinct from rodenticide impregnated grain, or pellets formed of the same or similar rodenticide, feed, and binder. As used herein bait block referrers to one or more items of bait which can be secured within a bait receptacle which provides a sufficiently large access opening that the targeted rodent can gain access to the rodenticide within the bait receptacle.

It should be understood that where lid prongs with hooked ends are shown, other arrangements of structures which depend downwardly from the lid and which lock the lid to receptacles in the base of the bait station could be used.

It should be understood that where the floor 26, 126 is described and claimed as completely surrounded by the peripheral wall 28, 128 the wall may define one or more rodent openings, which do not completely break the wall, rather they leave a continuous upper peripheral edge 30, 130.

It should be understood that the reinforcing interior wall segments 50, 66, 160 which create double walls and reinforced corners which form part of the bait receptacle 36, 136, extend upwardly from the floor 26, 126 of the bait stations and extend substantially the height of the peripheral wall 28, 128. The interior wall segments are integrally formed as part of the base molding.

It should be understood, moreover, that the peripheral walls of the bait stations extend from the base floor to support the bait station cover. The interior walls are formed either wholly integral with the base or extend from the base and the cover, typically mostly from the base.

In general the bait station is designed with interior walls shielding the bait from the rodent accessible opening so that if the rodent proceeds by 90° turns at least two or three 90° turns must be made to reach the bait, thus effectively isolating the bait from the rodent access opening.

The center 90, 185 of the lid 24, 124 is defined as the center point which is most distant from all points on peripheral edge 94, 175 of the lid, and practically within a region closer to the center point than the peripheral edge.

It is understood that the invention is not limited to the particular construction and arrangement of parts herein illustrated and described, but embraces all such modified forms thereof as come within the scope of the following claims.

We claim:

1. A single use rodent bait station comprising:
   a base having a floor and an upwardly extending outer peripheral wall, defining an interior and an exterior outer peripheral wall height;
   a lid internally locked without provision for opening to the outer peripheral wall by a plurality of downwardly protruding prongs which engage retaining surfaces formed in the base, and overlying the base to define a bait station interior;
   portions of the outer peripheral wall defining at least one rodent access opening;
   an interior wall extending upwardly from the floor;
   a bait receptacle defined between the interior wall and the outer peripheral wall; and
   a portion substantially centrally located on the lid which extends downwardly into locking engagement with a central protrusion extending up from the base and extending from the interior wall without provision for opening, wherein the portion substantially centrally located on the lid is another downwardly protruding prong that is located within an area on the lid bounded by the plurality of downwardly protruding prongs.

2. The single use rodent bait station of claim 1, wherein the bait receptacle is accessible only using a bait access path defined between the at least one rodent access opening and the bait receptacle, the bait access path requiring a rodent to proceed by at least two 90° turns to reach a bait block positioned in the bait receptacle.

3. The single use rodent bait station of claim 1, wherein the interior wall extends upwardly from the floor substantially to the lid and extends into the bait station interior from the outer peripheral wall.

4. The single use rodent bait station of claim 1, wherein the outer peripheral wall has at least one corner with an included angle of less than 135°.

5. The single use rodent bait station of claim 1, further comprising at least one reinforcing wall segment opposite the interior wall and extending from a first segment of the outer peripheral wall to a second segment of the outer peripheral wall to create a reinforced corner, the at least one reinforcing wall segment extending upwardly from the floor to substantially a same height as the interior height of the outer peripheral wall.

6. The single use rodent bait station of claim 1, wherein the outer peripheral wall includes one or more corners reinforced by one or more additional interior walls that extend between adjacent sides of the outer peripheral wall, and at least one side of the outer peripheral wall is reinforced by a first reinforcing interior wall spaced inwardly of the outer peripheral wall.

7. The single use rodent bait station of claim 6, wherein at least one of the one or more corners forms part of the bait receptacle, and wherein the outer peripheral wall having the at least one of the one or more corners is reinforced by a second reinforcing interior wall spaced inwardly from the outer peripheral wall at the at least one of the one or more corners and joined to the outer peripheral wall.

8. The single use rodent bait station of claim 1, wherein a portion of the outer peripheral wall defines a portion of the bait receptacle with an inner peripheral wall which extends parallel to and along at least part of the portion of the outer peripheral wall defining the bait receptacle, and wherein said inner peripheral wall is connected at a plurality of positions to the portion of the outer peripheral wall.

9. The single use rodent bait station of claim 1, wherein an upper peripheral edge of the base and an outer peripheral edge of the lid meet along a labyrinth joint.

10. The single use rodent bait station of claim 1, further comprising a bait block positioned in the bait receptacle in the bait station interior, the bait receptacle being defined by a portion of the floor and a portion of the lid overlying said floor portion, and portions of the interior wall such that the bait block is secured against removal from the bait receptacle.

11. The single use rodent bait station of claim 10, wherein the interior wall extends from the floor and the peripheral wall and extends substantially to the lid, such that the peripheral wall and the interior wall separate the bait block in the bait receptacle from the at least one rodent access opening, so that a bait access path defined between the at least one rodent access opening and the bait block requiring at least two 90° turns to reach the bait block in the bait receptacle.

12. The single use rodent bait station of claim 10, wherein the interior wall separates the bait block in the bait receptacle from the at least one-rodent access opening, so that no line of sight passing through the at least one rodent access opening intersects the bait block, and so that the line of sight must be rotated at least substantially 180° to engage the bait block.

13. The single use rodent bait station of claim 10, wherein the lid is translucent or transparent such that the bait block can be seen through the lid.

14. The single use rodent bait station of claim 1, wherein the interior and exterior outer peripheral wall heights extend along an entire length of the outer peripheral wall.

* * * * *